Figure 1:
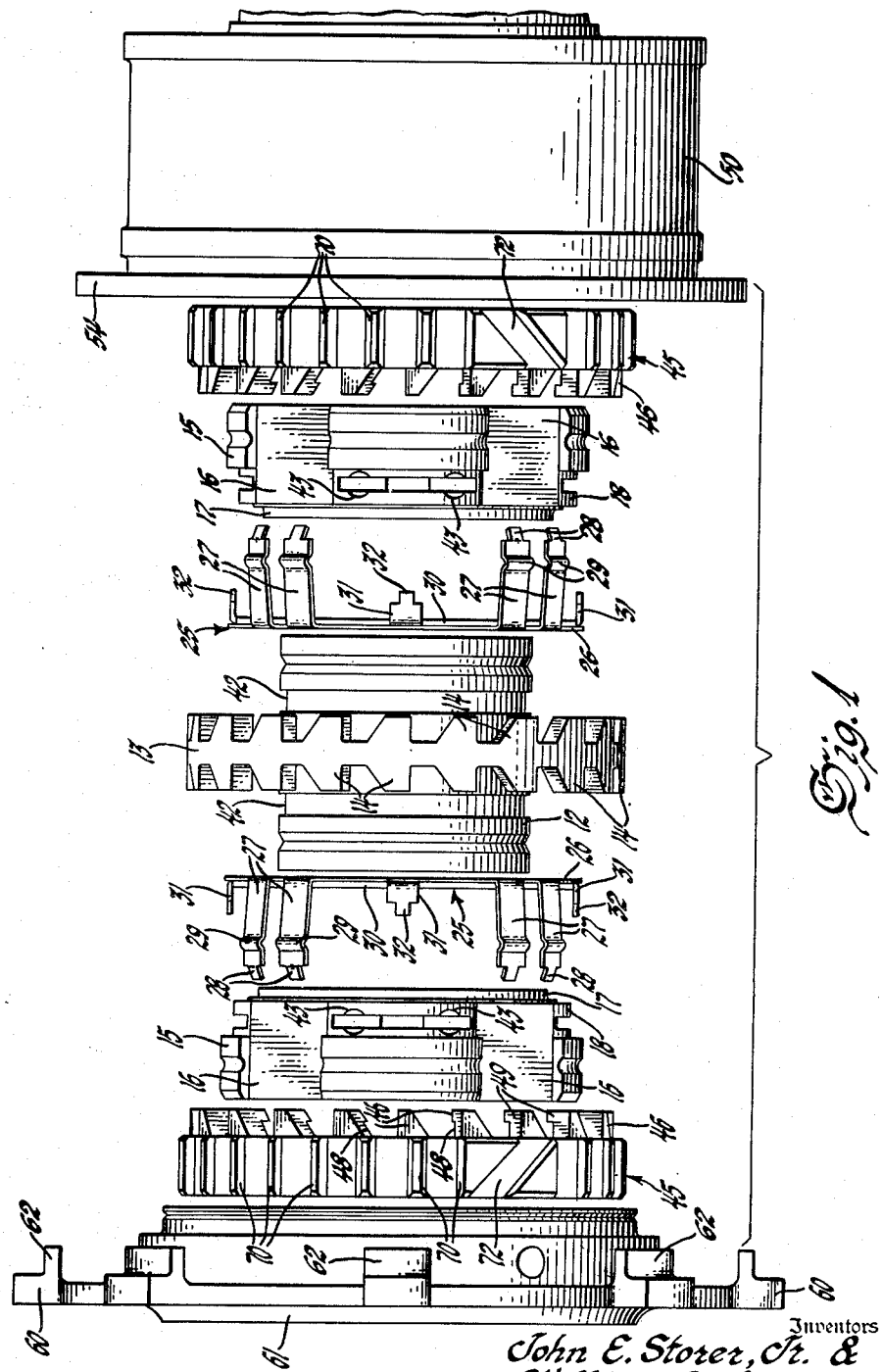

Aug. 4, 1953     J. E. STORER, JR., ET AL     2,647,599
OVERRUNNING CLUTCH

Filed Sept. 5, 1950     3 Sheets-Sheet 1

Inventors
John E. Storer, Jr. &
William G. Livezey
By
Willis, Helmig & Baillio
Attorneys Aug. 4, 1953  J. E. STORER, JR., ET AL  2,647,599
OVERRUNNING CLUTCH
Filed Sept. 5, 1950  3 Sheets-Sheet 3

Inventors
John E. Storer, Jr. &
William G. Livezey.
By
Willits, Helwig & Bailie
Attorneys Patented Aug. 4, 1953

2,647,599

UNITED STATES PATENT OFFICE 2,647,599

OVERRUNNING CLUTCH

John E. Storer, Jr., and William G. Livezey, Indianapolis, Ind., assignors to General Motors Corporation, Detroit, Mich., a corporation of Delaware Application September 5, 1950, Serial No. 183,162

7 Claims. (Cl. 192—48)

Our invention relates to an overrunning clutch and particularly to an improved device of this type.

It has heretofore been proposed to construct a device of this type in which the driving and driven members of a clutch are provided with counterpart teeth on axially confronting faces, the teeth associated with one of the clutch members being located on a clutch member which is movable axially of the other clutch member, while means have been provided for moving this movable clutch member towards or away from the other clutch member according as the speed of the driving member was greater or less than the speed of the driven member.

However, with the overrunning clutches of the type heretofore available it has been difficult to secure prompt and positive operation under conditions in which the relative speeds of the driving and driven shafts fluctuate rapidly. With the overrunning clutches heretofore available, if the speed of the driven shaft rapidly increased relative to that of the driving shaft, the movable member of the overrunning clutch would be moved into engagement with an abutment so rapidly, and with such force, that the movable member would bounce or return toward its engaged position from which it would again be moved to the disengaged position. This cycle might be repeated at high frequency for a substantial period of time, during which there would be no effective driving connection between the driving and driven shafts. This shortens the life of the clutch and creates objectionable noise.

An object of this invention is to provide an improved overrunning clutch.

A further object of the invention is to provide an improved overrunning clutch of the jaw type which is arranged so that movement of the movable one of the jaw clutch members between its engaging and released positions is prompt and positive, and so that after movement of the movable jaw clutch member to either of its two positions, the member will remain in that position until the relative speeds of the driving and driven shafts change.

Another object of the invention is to provide an improved overrunning clutch of the type described which includes resilient detents to yieldingly retain the movable jaw clutch member in at least a selected one of its two positions.

A further object of the invention is to provide an overrunning clutch employing a movable jaw clutch member and incorporating improved means responsive to movement of the driving shaft more rapidly than the driven shaft to cause movement of the movable jaw clutch member to the engaging position.

Another object of the invention is to provide an improved overrunning clutch employing driving and driven jaw clutch members, the driving member being axially movable and being associated with a driving element, the clutch including means responsive to rotative movement of the driving member forward relative to the driven member to actuate rockers and temporarily arrest movement of the driving member relative to the driven member and thereby produce relative movement between the driving member and the driving element which causes the driving member to move towards the engaged position.

Other objects of the invention and features of novelty will be apparent from the following description taken in connection with the accompanying drawings.

In practicing our invention we provide a driving and a driven clutch member with axially confronting jaw teeth having parallel faces which engage to establish driving connection between the clutch members. These teeth also have angular faces which engage when the driven member turns more rapidly than the driving member, and which when engaged cause the driving member to move axially away from the driven member towards the disengaged position. The driving clutch member is associated with a clutch element in such manner that limited relative rotative movement of the clutch member and clutch element is permitted and so that this relative movement causes the clutch member to move axially relative to the clutch element and also relative to the driven clutch member. The parts are arranged so that driving clutch member moves to the engaged position when the clutch element moves forward relative to the clutch member, and so that the driving clutch member moves to the disengaged position when the clutch member moves forward relative to clutch element. The driving clutch member and the clutch element are also arranged so that positive driving connection is established therebetween after limited forward relative movement of the clutch element.

The clutch assembly also includes means responsive to forward movement of the driving member relative to the driven member for operating rockers to temporarily arrest movement of the driving member and thus produce movement of the driving element forward relative to the driving member so that the driving member moves axially toward the engaged position and releases the rockers.

The clutch assembly also includes means yieldingly opposing movement of the driving member away from its disengaged position so that on movement of this member to the disengaged position it will remain there until conditions are such that the member should move to the engaged position.

Figure 2:
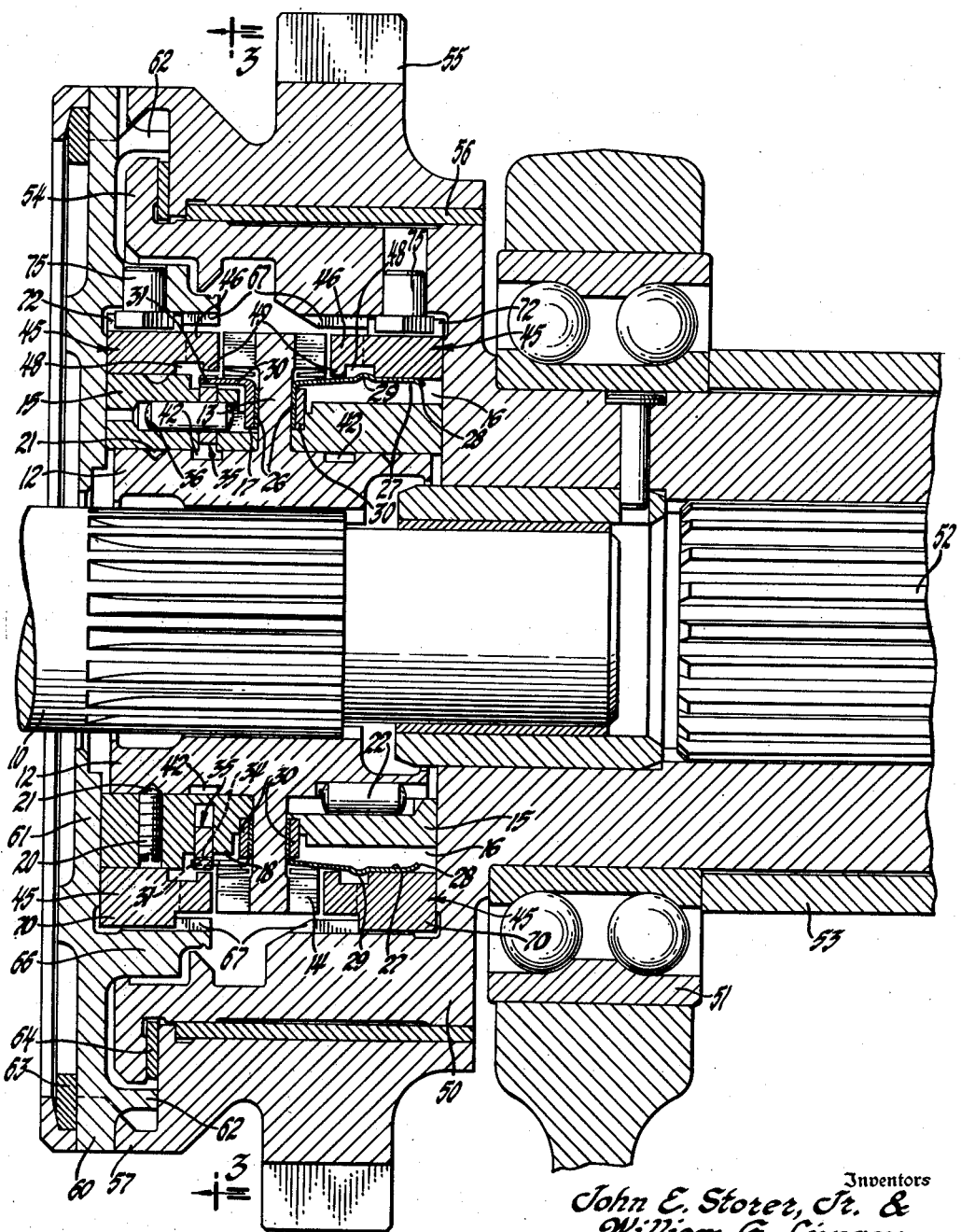
Figure 3:
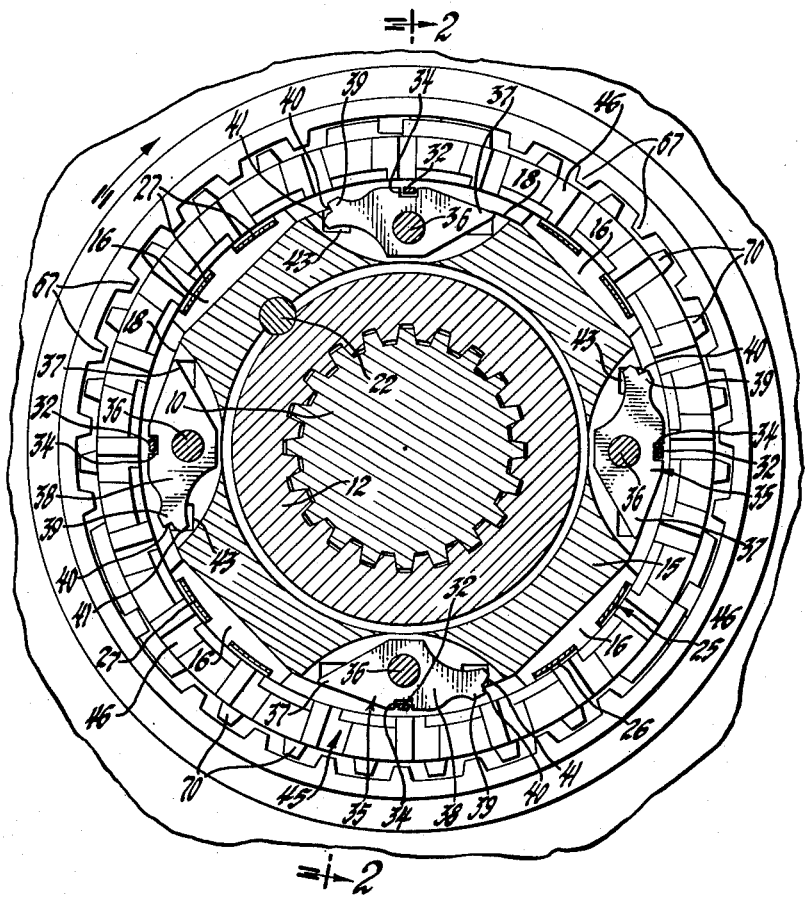
Figure 4:
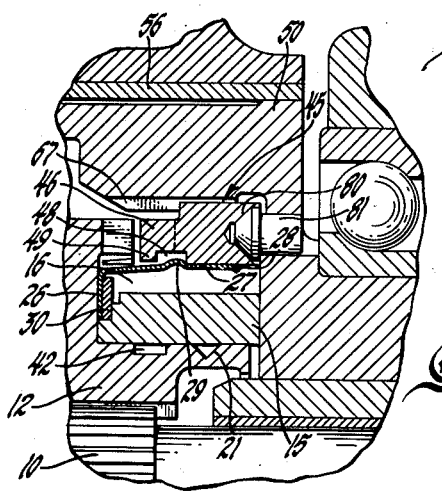

In the drawings,

Fig. 1 is an exploded view of the principal components of a unit incorporating two overrunning clutches provided by this invention, Fig. 2 is a sectional view of a unit employing the components illustrated in Fig. 1, Fig. 3 is a sectional view taken substantially along the line 3—3 on Fig. 2, and Fig. 4 is a fragmentary view showing a modification which we may employ.

Referring to the drawings, Fig. 1 thereof is an exploded view of an assembly which includes two overrunning clutches provided by this invention so that a driven shaft may be driven by whichever one of two driving elements is rotating the more rapidly. Although the assembly shown in Fig. 1 employs two overrunning clutches, it is to be understood that the clutch is not limited to use in this manner, and that the clutch may be used singly if desired. The two clutches employed in the assembly shown in Fig. 1 are substantially identical in construction and operation.

The driven shaft 10 has splined thereon the member 12 which is the driven member of both of the overrunning clutches. The driven shaft 10 is not shown in Fig. 1 of the drawings, but is shown in Figs. 2 and 3. The member 12 has a centrally located radially outwardly extending flange 13 which has on the axially opposite faces thereof driving teeth 14 which are adapted to be engaged by counterpart teeth on the driving members of the clutches. As is clearly shown in Fig. 1 of the drawings each of the teeth 14 has at the trailing side thereof a face which is substantially parallel to the axis of the shaft on which the driven member 12 is mounted. In addition, each of the teeth 14 has at its other or leading side a face which extends at a substantial angle to the axis of the shaft on which the driven member is mounted, the angle of these tooth faces being such that the ends of the tooth faces adjacent the free ends of the teeth are rotatively in arrears of the opposite ends of the tooth faces.

The teeth 14 are located adjacent the periphery of the flange 13 on the driven member 12, the radially inner edges of the teeth being spaced a short distance from the radially outer face of the central hub portion of the driven member, as is clearly shown in Fig. 2 of the drawings.

The hub portion of the driven member 12 is relatively long and has rigidly secured thereon on each side of the flange 13 a collar 15 which is of such thickness radially that the outer face of the collar is located radially inwardly of the radially inner edges of the teeth 14. Each collar 15 has in the radially outer face thereof a plurality of relatively wide, but relatively shallow, spaced recesses 16 which extend throughout the entire axial extent of the collar.

Each collar 15 has on the end thereof confronting the teeth 14 a relatively narrow flange 17 of smaller diameter than the inner faces of the recesses 16, this flange being separated from the main body of the collar by a relatively wide portion 18 which is of larger diameter than the flange 17, and is also of larger diameter than the inner faces of the recesses 16, but is of smaller diameter than the principal portion of the collar 15.

Each of the collars 15 is secured in position axially of the driven member 12 by a set screw 20 the inner end of which extends into a groove 21 in the face of the driven member 12. Each of the collars 15 is secured in position rotatively of the driven member 12 by a plurality of pins 22, one of which is shown in Fig. 3 of the drawings. As is clearly shown in Fig. 3 of the drawings, each of the pins 22 is located in a drilled hole which extends across the line of division or joint between the hub of the driven member 12 and the collar 15. The set screws 20 and the pins 22, therefore, cooperate to rigidly secure each of the collars 15 on the driven member 12 so that the collars 15 cannot move either axially or rotatively relative to the driven member.

Each of the collars 15 has associated therewith a member indicated generally by the number 25 and including a member 26 which is formed of spring sheet metal and which has an annular central portion which is located between the collar 15 and a face of the flange 13 on the driven member 12. The member 25 includes a plurality of fingers 27 which are formed integral with central portion of the member 26 and are bent relative thereto so as to extend substantially axially of the collar 15. The fingers 27 are arranged in pairs and are spaced circumferentially of the central portion of the member 26 so that each pair of fingers 27 is adapted to be received by one of the recesses 16 in the face of one of the collars 15. The fingers 27 and the recesses 16 are proportioned so that a pair of fingers 27 are somewhat narrower than the recess 16 in which the fingers are received. Hence the fingers 27 may move rotatively relative to a collar 15 a short distance before further movement of the fingers is prevented by engagement of the fingers with a side of a recess 16.

Each of the fingers 27 has at its free end a portion 28 of reduced width which is bent radially inwardly to facilitate insertion of the fingers 27 which are urged radially outwardly by the inherent resiliency of the material of which the member 25 is constructed. Each of the fingers 27 has intermediate its ends a transversely extending rib 29 formed by bending the material of the finger through a relatively short radius.

The central portion of the member 26 of the member 25 has rigidly secured thereto an annular member 30 which is of substantially the same size as the central portion of the member 26 but is formed of somewhat heavier material than the member 26. The member 30 has formed integral therewith a plurality of fingers 31 which are spaced apart circumferentially of the member 30 so that a finger 31 is located between each pair of fingers 27. As is clearly shown in Fig. 2 of the drawings, the fingers 31 are adapted to extend over the shoulder portions 18 on the collars 15, while the fingers 31 are of such length that they do not reach all of the distance across the shoulders 18 with the result that the free ends of the fingers 31 are spaced from the surface at the inner edge of the shoulders 18. In addition, as is clearly shown in Fig. 2 of the drawings, the member 30 is proportioned so that the radially outer faces of the fingers 31 are situated radially inwardly of the outermost surfaces of the collars 15. As is best shown in Fig. 1 of the drawings, each of the fingers 31 has at its free end a tip portion 32 of reduced width.

As is clearly shown in Fig. 2 of the drawings, the central portion of each of the members 25 is mounted on the flange portion 17 of a collar 15 and is located between the shoulder portion 18 of the collar and a face of the flange 13 on the driven member 12. The various parts of the apparatus are proportioned so that the members 25 are firmly held between the collars 15 and the flange 13, but so that the members 25 are free to turn on the collars 15 to the extent permitted.

The shoulder portion 18 of each of the collars 15 has therein a plurality of narrow slots, there being one such slot in each section of the shoulder portion between each pair of recesses 16. Each of these recesses has mounted therein a rocker indicated generally by the reference numeral 35 which is pivoted intermediate its ends on a pin 36 which is mounted in a hole drilled in the collar 15.

Each of the rockers 35 is formed of sheet metal substantially equal in thickness to the width of the slot in which the rocker is mounted. Each of the rockers 35 is of the configuration shown in Fig. 3 of the drawings, where it will be seen that each of the rockers has in its radially outer face a centrally located notch or recess 34 which is adapted to receive the tip portion 32 of a finger 31.

As is clearly shown in Fig. 3 of the drawings, each of the rockers 35 has a relatively wide central portion adjacent the associated pin 36, and each end of each rocker tapers or decreases in width away from the central portion. The clutch driving and driven members are intended to rotate in the clockwise direction as viewed in Fig. 3 of the drawings, that is in the direction indicated by the arrow. The rockers 35 are mounted on the pins 36 so that the leading end portion 37 of each rocker is in the form of a triangle, the radially outer face of this end portion of the rocker being smooth and being located radially inwardly of the outermost surface of the principal portion of the associated collar 15.

The radially outer face of the trailing end portion 38 of each rocker 35 is irregular and has adjacent the end of the rocker a projection 39 the trailing edge or face 40 of which extends substantially radially of the collar 15. The radially outer face of each rocker 35 has between the projection 39 and the end of the rocker a shoulder 41 which extends generally perpendicular to the edge 40 on the projection 39.

The total weight and weight distribution of the two end portions 37 and 38 of each rocker are proportioned so that the end 38 is slightly heavier than the end 37 so that on rotation of the clutch centrifugal force exerts a limited force on the ends 38 tending to move them radially outwardly. This centrifugal force assists the spring member 25 in moving the rockers 35 to their engaged position during operation of the clutch at high rotational speeds, at which time the rockers 35 press firmly against the pins 36 and there is substantial frictional resistance to movement of the rockers.

As hereinafter explained, each of the rockers 35 is at times turned on the associated pin 36 in a counterclockwise direction by the member 25. The various parts of the equipment are arranged so that on this movement of a rocker 35, the projection 39 on the trailing end portion 38 of the rocker extends radially outwardly of the outermost surface of the principal portion of the associated collar 15, and so that the surface 41 on the rocker is located substantially in the plane of the surface of the principal portion of the associated collar 15. The hub portions of the driven member 12 have grooves 42 therein radially inwardly of the rockers 35 so that turning of the rockers 35 is not restricted by engagement of the inner faces of the rockers with the driven member 12.

As hereinafter explained, the projections 39 on the rockers 35 at times engage projections on a driving member. As a result of this engagement the projection may be deformed slightly and to prevent the rocker from binding in the slot in which the rocker is mounted, the portion of each slot adjacent the projection 39 on a rocker mounted in the slot is relieved or increased in width by a hole drilled in the collar and extending across the slot, as indicated at 43. Each of the collars has holes 43 at both ends of each slot so that the same collar 15 may be employed on either side of the driven member 12.

Each clutch includes a driving member 45 which is movable axially relative to the driven member 12 and which has on the face thereof confronting the teeth 14 on the member 12, teeth 46 which are substantially counterparts of the teeth 14. Each of the teeth 46 has on the leading side thereof a face which is substantially parallel to the axis of the driving member. In addition, each of the teeth 46 has at the trailing side thereof a face which extends at a substantial angle to axis of the member 45, the angle of these tooth faces being such that the ends of the tooth faces adjacent the free ends of the teeth are rotatively in advance of the opposite ends of the tooth faces. The angle of the faces at the trailing sides of the teeth 46 is substantially the same as the angle of the faces at the leading sides of the teeth 14 on the driven member 12. In addition, the spacing of the teeth 46 and of the teeth 14 is such that when a driving member 45 is moved towards the teeth on the flange 13 on the driven member 12, the teeth 46 extend between the teeth 14 and the parallel leading faces on the teeth 46 confront the parallel trailing faces on the teeth 14.

Each of the driving members 45 is in the form of an annular ring the inner diameter of which is substantially equal to the outer diameter of the principal portion of one of the collars 15 so that each of the driving members 45 is rotatable on and is supported by one of the collars 15. As is best shown in Fig. 2 of the drawings, each of the driving members has on the radially inner face thereof a relatively shallow, but relatively wide groove 48 which is located so that the groove 48 extends across the base of the teeth 46, leaving a narrow inwardly extending projection 49 adjacent the free end of each of the teeth.

The various parts of the equipment are arranged and proportioned so that when a driving member 45 is moved away from the flange 13 on the driven member 12 the maximum amount, the ribs 29 on the fingers 27 extend into the groove 48 in the driving member, as clearly shown in Fig. 2 of the drawings, and yieldingly resist movement of the driving member 45 towards the teeth on the driven member. In addition, as is clearly shown in Fig. 2 of the drawings, in this position of a driving member 45, the teeth 46 thereon are out of alignment with the cooperating teeth 14 on the driven member 12.

Each driving member 45 has associated therewith driving means in the form of a driving element for causing rotation of the driving member and for permitting axial movement of the driving member. In the specific construction illustrated in Fig. 2 of the drawings, there is provided a drum indicated generally by the reference numeral 50 and having formed integral therewith a hub portion which is supported in a suitable housing by a ball bearing 51 and which is internally splined to receive the splined end of a driving shaft 52. The ball bearing 51 is located between a shoulder on the drum 50 and a collar 53 secured on the hub of the drum 50 so that the ball bearing 51 serves to prevent axial movement of the drum 50. As is clearly shown in Fig. 2 of the drawings, the reduced end portion of the driven shaft 10 is supported in a bushing in the drum 50.

The open end of the drum 50 is surrounded by an outwardly extending flange 54, while a spur gear 55 is rotatably supported on the bushing 56 on the exterior of the drum 50. The gear 55 may be driven in any suitable manner, not shown. The gear 55 has formed integral therewith an axially extending flange 57 which surrounds and extends over the flange 54 on the drum 50. The flange 57 has in its exposed edge a plurality of circumferentially spaced notches or recesses which are adapted to receive radially outwardly extending fingers 60 on the driving element 61. The faces of the fingers 60 confronting the drum 50 have thereon projections 62 which are adapted to engage a shoulder on the gear 55 to locate the element 61 relative to the drum 50. The portion of the flange 57 which projects beyond the fingers 60 on the element 61 has in the inner face thereof a groove in which there is mounted a lock ring 63 which engages a face of the element 61 to secure the element 61 to the gear 55. The outer face of the lock ring 63 and the cooperating face of the groove in which the ring is mounted are tapered so that on expansion of the lock-ring the projections 62 are forced against the shoulder on the gear 55 to rigidly secure the element 61 and the gear 55 together.

One of the collars 15 extends between the element 61 and the flange 13 on the driven member 12, while the other collar 15 extends between the flange 13 and a shoulder on the drum 50. When the lock-ring 63 expands and draws the element 61 and the gear 55 together the gear 55 exerts force through a thrust washer 64 on the flange 54 to press the drum 50 towards the element 61 and thus cause the collars 15 to be firmly pressed against the flange 13. In this manner the various parts of both clutches, except the movable elements 45, are rigidly secured together against axial movement.

The element 61 has formed integral therewith an axially extending flange 66 which surrounds one of the driving members 45. The inner face of the flange 66 is splined, there being relatively narrow inwardly extending projections 67 which are separated by relatively wide grooves or recesses, as is best shown in Fig. 3 of the drawings. The exterior face of each of the driving members 45 is similarly splined, there being relatively narrow outwardly extending projections 70 which are separated by relatively wide grooves or recesses. The projections 67 are adapted to be received between the projections 70, and the projections 70 are adapted to be received between the projections 67. The projections 67 and 70 cooperate to cause the element 61 to drive the member 45 but to permit limited relative rotation between the members 61 and 45.

The other one of the driving members 45 is of similar construction and has on its outer face projections 70 which cooperate with counterpart inwardly extending projections 67 on the drum 50, which is the driving element for this one of the clutches.

Each of the driving members 45 has associated therewith means for causing axial movement thereof in response to relative rotative movement between the driving member 45 and the driving means or driving element therefor. Each of the driving members 45 has formed in the exterior face thereof a plurality of helical grooves 72, one of which is shown in Fig. 1 of the drawings for each of the members 45. Each of the grooves 72 is disposed at an angle such that the end of the groove adjacent the teeth 46 on the member 45 is rotatively in arrears of the other end of the groove. The splines or projections 70 are not formed in the portions of the surface of a member 45 adjacent the grooves 72, while the splines or inwardly extending projections 67 are omitted from the corresponding portions of the driving elements 61 and 50 in which the members 45 are mounted.

The element 61 has associated therewith a plurality of guide pins 75 each of which has a shank which is mounted in a hole extending through the flange 66 on the member 61. Each of the guide pins 75 has on its inner end a relatively thin head with parallel flat faces, the head being of such size as to be received by one of the grooves 72 and to extend substantially the entire distance between opposite sides of the groove.

The shaft 52 is the driving source for one of the overrunning clutches, and the gear 55 is the driving source for the other one of the overrunning clutches, while the shaft 10 is driven by both clutches. The shaft 52 and the gear 55 may be driven in any suitable manner, these members being independently driven in such manner that at times the shaft 52 rotates more rapidly than the gear 55, and that at other times the gear 55 rotates more rapidly than the shaft 52.

The clutches are shown in Fig. 2 of the drawings with the movable driving members 45 are in their disengaged position. As hereinafter explained, when a driving member 45 is moved to its disengaged position, that is the position in which these members are shown in Fig. 2 of the drawings, the driving member 45 is rotated forwardly relative to the driving element therefor, this rotation occurring because of the angularity of the slots 72. As a result of the relative forward rotation of a driving member 45, the splines 70 thereon are moved away from the leading faces of the splines 67 on the associated driving element with the result that the only driving connection between a driving element and the associated driving member is through the guide pins 75 and the helical slots 72 in the driving member 45. For purposes of illustration it will be assumed that the shaft 52 is now rotated in a clockwise direction as viewed from the right hand end of Figs. 1 and 2 of the drawings. On this rotation of the shaft 52 the drum 50 rotates and the guide pins 75 cause the driving member 45 to turn with the drum 50. The spring fingers 27 frictionally engage the inner face of the driving member 45, and on rotation of the member 45 force is exerted on the fingers 27 to turn the member 25 relative to the associated collar 15.

As a result of this turning of the member 25 the fingers 31 exert force on the rockers 35 to cause them to pivot on the pins 36 so that the projections 39 on the trailing ends of the rockers 35 move radially outwardly into the path of movement of the projections 49 on the inner faces of the teeth 46 on the member 45. This movement of the rockers 35 occurs as a result of a very small amount of movement of the driving member 45 relative to the collar 15 so engagement of the clutch is initiated promptly on forward rotation of the drum 50 relative to the driven member 12, and engagement of a clutch is effected before a very great difference in speed can develop between driving member 45 and the driven member 12.

The rockers 35 are mounted on the collar 15 which is rigidly secured on the driven member 12 so that on engagement of the projections 39 on the rockers 35 with the projections 49 on the teeth 46 of the member 45, rotation of the member 45 relative to the collar 15 is arrested. On the continued application of force through the guide pins 75 to turn the member 45, the heads of the guide pins 75 acting on the helical faces of the grooves 72 cause the member 45 to move axially towards the flange 13 on the driven member 12.

As pointed out above, the rockers 35 are secured on a collar 15 which is secured on the driven member 12 which has the teeth 14 formed thereon, while the projections 39 on the rockers 35 engage the projections 49 on a driving member 45, thereby arresting rotation of the driving member 45 relative to the driven member 12. The various parts of the equipment, particularly the location of the projections 39 on the rockers 35 with respect to the teeth 14 on the driven member 12, are arranged so that when a driving member 45 is in the position in which it is held by the rockers 35, the teeth 46 on the driving member 45 are in alignment with the spaces between the confronting teeth 14 on the driven member 12.

On continued rotation of the drum 50 after rotation of the driving member 45 relative to the driven member 12 has been stopped by the rockers 35, the guide pins 75 press against the angular faces of the helical grooves 72 and exert force to move the driving member 45 axially relative to drum 50 and the driven member 12. This movement of the member 45 is yieldingly opposed by engagement of the member 45 with the ribs 29 on the fingers 27, but on the application of a moderate degree of force, the member 45 moves over the ribs 29, the fingers 27 being deflected inwardly.

As is apparent from Fig. 2 of the drawings, after a small amount of movement of the member 45 axially, the tips of the teeth 46 on the member 45 are located within the spaces between the teeth 14 on the driven member 12. In addition, as is apparent from Fig. 2 of the drawings, after a small additional amount of movement of the member 45 axially towards the flange 13 on the driven member 12, the projections 49 on the teeth 46 are moved out of alignment with the rockers 35 and therefore out of engagement with the projections 39 on the ends of the rockers. After this amount of axial movement of the driving member 45 the groove 48 is located radially outwardly of the rockers 35. The groove 48 is of such depth, and the range of movement of the rockers 35 is such that the projections 39 on the rockers 35 will not engage the bottom face of the groove 48. Hence, after this movement of the driving member 45 the rockers 35 are ineffective to restrain the driving member 45.

As soon as the projections 49 become disengaged from the projections 39 on the rockers 35, the driving member 45 is free to turn relative to the driven member 12, and the driving member 45 does turn relative to the driven member 12 until the straight leading faces on the teeth 46 engage the straight trailing faces on the teeth 14 on the driven member 12.

After engagement of the teeth 46 with the teeth 14, further rotative movement of the driving member 45 relative to driven member 12 is prevented, and force is exerted through the teeth 46 and 14 to drive the member 12. As long as the member 45 is driven through the guide pins 75, force is exerted to move the member 45 axially relative to the drum 50 so that the teeth 46 move relative to the teeth 14 until the tips of the teeth 14 approach the bottoms of the spaces between the teeth 46 and the tips of the teeth 46 approach the bottoms of the spaces between the teeth 14.

During the previously described axial movement of the driving member 45 relative to the drum 50, the drum 50 is turning forward rotatively relative to the driving member 45 with the result that the leading faces on the splines 67 on the drum 50 move into engagement with the trailing faces on the splines 70 on the driving member 45. On this engagement of the splines 67 and 70 the driving member 45 is positively driven by the drum 50 and there is no further movement axially or rotatively of the member 45 relative to the drum 50. The various parts of the equipment are arranged and proportioned so that the driven member 45 will move axially of the drum 50 an amount sufficient to cause substantially complete engagement of the teeth 46 and 14 when the drum 50 moves rotatively relative to the driven member 45 far enough to cause driving engagement of the splines 67 and 70. In addition, the various parts of the equipment are arranged and proportioned so that the drum 50 will move rotatively relative to the driven member 45 far enough to establish driving engagement between the splines 67 and 70 before the member 45 has moved axially far enough to cause the tips of the teeth 46 to engage the bottoms of the spaces between the teeth 14 or to cause the bottoms of the spaces between the teeth 46 to be engaged by the tips of the teeth 14.

From the foregoing it will be seen that on initial forward movement of the drum 50 relative to the driven member 12, the driving member 45 is turned relative to the driven member 12 by force transmitted from the drum 50 to the member 45 through the guide pins 75. On this movement of the driven member 45 relative to the member 12 force is transmitted to the member 25 because of frictional engagement of the spring fingers 27 with the inner face of the member 45 so the member 25 turns a small amount relative to the member 12 and tilts the rockers 35 so that the projections 39 engage the projections 49 on the teeth 46 of the member 45 and prevent further movement of the member 45 rotatively relative to the member 12. However, force continues to be applied through the guide pins 75 to the member 45, and because of the angularity of the slots 72 in which the heads of the guide pins 75 are mounted, the member 45 is caused to move axially to bring the teeth 46 into alignment with the teeth 14 and to move the projections 49 on the teeth 46 out of engagement with the projections on the rockers 35. After disengagement of the rockers 35, the driving member 45 moves rotatively relative to the member 12 until the teeth 46 engage the teeth 14, after which the drum 50 turns relative to the member 45 until the splines 67 engage the splines 70 to provide a firm driving connection between the drum 50 and the member 45, while during this latter rotative movement of the drum 50 relative to the member 45, the member 45 moves axially relative to the drum 50 so that the teeth 46 and 14 are brought into substantially complete engagement. At this time therefore, the drum 50 drives the driving member 45 through the splines 67 and 70, while the driving member 45 drives the driven member 12 through the teeth 46 and 14. Hence, a positive driving connection is established between the driving shaft 52 and the driven shaft 10.

As long as the driving shaft 52 is rotated at a speed high enough to drive the driven shaft 10, the various parts of the overrunning clutch associated with the shaft 52 remain in the positions outlined above.

When the driven member 12 is rotated by power supplied by the shaft 52, the collar 15 on the left hand side of the flange 13, as viewed in Fig. 2 of the drawings, is rotated. On rotation of this collar 15, the associated member 25 is rotated and the spring fingers 27 thereof frictionally engage the inner face of the associated driving member 45 so that the member 25 tends to turn relative to the collar 15. At this time this collar 15 is being turned in the clockwise direction, as viewed in Fig. 3 of the drawings, while the associated driving element 45 is assumed to be stationary. Accordingly, the member 25 causes the rockers 35 to pivot in the direction to move the projections 39 radially inwardly and to move the leading ends 37 of the rockers 35 radially outwardly. As explained above the ends 37 have smooth outer faces and taper in such manner that these ends will not engage the projections 49 on the driving member 45.

The various parts of the equipment are arranged so that on initial movement of member 45 away from the engaged position, the tips 39 of the rockers 35 are between teeth 46 on the member 45. Hence the tips 39 on the rockers 35 will not interfere with initial movement of the member 45. The leading edges of the projections 39 are curved so that if on forward movement of the collar 15 relative to a member 45 the projections 39 engage the projections on the inner face of the teeth 46, the projections 39 will slide under the projections 49 on the teeth 46, thereby tilting the rockers 35 to move the projections radially inwardly. Hence, the collar 15 is certain to turn freely relative to the member 45 associated with the driving element 61 and the force exerted on this member 45 by the spring fingers 27, as well as by frictional engagement between the collar 15 and the member 45, tends to move the member 45 rotatively relative to the element 61 in such a direction that force exerted by the faces of the helical grooves 72 pressing against the guide pins 75 tends to move the member 45 axially away from the flange 13 on the member 12 so that the teeth 46 on this driving member are maintained out of engagement with the confronting teeth on the member 12.

For purposes of illustration it will be assumed that the rate of rotation of the shaft 52 decreases and that the rate of rotation of the shaft 10 is maintained because of the momentum of the mechanism, not shown, which is driven by the shaft 10.

As soon as the speed of the shaft 52, and therefore of the drum 50, is reduced below the speed of the shaft 10, and therefore of the driven member 12, the angular leading faces of the teeth 14 on the driven member 12 engage the angular trailing faces of the teeth 46 so that force is exerted on the member 45 to move the member 45 axially relative to the drum 50, and to turn the member 45 forward relative to the drum 50. In addition, at this time, as the driven member 12 and the collar 15 are turning more rapidly than the driven member 45 and the drum 50, the spring fingers 27 exert force on the member 45 to turn the member 45 forward rotatively relative to the drum 50 while additional force having this effect is exerted on the member 45 because of frictional engagement between the member 45 and the collar 15 on the driven member 12. The forces tending to rotate the member 45 forwardly relative to the drum cause the angular faces of the grooves 72 in the member 45 to press against the guide pins 75 and thus cause the member 45 to move axially of the drum 50 as well as rotatively thereof.

As a result of the various forces exerted on the member 45 at this time the member 45 moves axially of the drum 50 so that the teeth 46 on the member 45 move out of engagement with the teeth 14 on the driven member 12. As soon as the teeth 46 move out of contact with the teeth 14 there is a reduction in the forces acting on the member 45, but the member continues to move toward the disengaged position because of the forces exerted thereon by the spring fingers 27 and by frictional engagement with the collar 15, and also because of the momentum of the member 45. Furthermore, when the member 45 is substantially in the position in which the teeth 46 move out of contact with the teeth 14, the ribs 29 on the fingers 27 begin to enter the groove 48 and to exert force on the member 45 tending to move the member 45 toward the disengaged position. This arrangement insures that even though there is a reduction in the force exerted in the member 45 at the time the teeth 46 move out of engagement with the teeth 14, sufficient force will continue to be exerted on the member 45 to move this member all of the way to the disengaged position, and to also insure that the tips of the teeth 14 will not engage the tips of the teeth 46.

When the member 45 moves to the disengaged position the end face of the member 45 engages the radially extending face on the drum 50 and there may be a tendency for the member 45 to rebound toward the flange 13 on the member 12. However, any tendency for the member 45 to move in this manner is yieldingly opposed by the ribs 29 on the spring fingers 27, and the force exerted by these ribs and opposing axial movement of the member 45 is sufficient to prevent improper movement of the member 45 away from the disengaged position.

As explained above in connection with the rockers 35 employed with the clutch associated with the driving element 61, when the driven member 12 turns more rapidly than a driving member 45, the spring fingers 27 cause the member 25 to tilt the rockers 35 so that the projections 39 move inwardly and the leading ends 37 of the rockers 35 move outwardly. However, the various parts are proportioned so that when a rocker 35 is tilted the maximum amount in this direction, all portions of the rocker are located radially inwardly of the innermost portions of the member 45 so that the rockers 35 do not interfere with axial movement of the member 45.

On movement of the member 45 axially of the drum 50 to the disengaged position, the member 45 is rotated forwardly relative to the drum 50 so that the trailing faces of the splines 70 on the member 45 are spaced from the leading faces of the splines 67 on the drum 50 with the result that the only driving connection between the drum 50 and the member 45 is through the guide pins 75.

From the foregoing it will be seen that as soon as the speed of the driving member 45 falls below the speed of the driven member 12, force is exerted on the member 45 to move the member 45 axially away from the driven member 12. The principal force acting on the member 45 at this time is that resulting from engagement of the angular faces on the teeth 46 and 14. This force develops after a very small amount of forward movement of the driven member 12 relative to the driving member 45 so the driving member 45 is moved to the disengaged position before a very great speed difference can develop between the driving member 45 and the driven member 12. As soon as the teeth 14 and 46 become disengaged the force resulting from their engagement ceases, but the other forces acting on the driving member 45 insure that this member completes its movement to the disengaged position, while the ribs 29 on the spring fingers 27 insure that the member 45 will remain in its disengaged position after it has been moved thereto.

The operation of the overrunning clutch associated with the driving element 61 is substantially the same as that of the clutch associated with the drum or driving element 50 with respect to engagement and disengagement and a detailed explanation of the operation of the clutch associated with the driving element 61 is unnecessary.

Each of the driving members 45 of the overrunning clutches moves to the engaged position when the associated driving element turns more rapidly than the driven member 12. Similarly, each of the driving members 45 moves to disengaged position when the associated driving element turns less rapidly. In the foregoing explanation, movement of one of the driving members to the engaged position is described at a time when the driven member 12 is at rest, but it should be understood that the operation of the equipment to cause movement of a driving member to the engaged position is substantially the same when the driven member 12 is rotating, and a driving element begins to rotate at a more rapid rate. In like manner, in the foregoing explanation, movement of one of the driving members 45 to the disengaged position is described at a time when the speed of the driven member 12 is maintained and the speed of a driving element is reduced, but it should be understood that the equipment operates in a similar manner to cause a driving member to move to the disengaged position when the speed relationship between a driving element and the driven member 12 changes because of an increase in the speed of driven member 12.

In Fig. 4 of the drawings there is shown a modified form of construction which we may employ. Except as hereinafter explained in detail, the species shown in Fig. 4 is the same as that shown in Figs. 1, 2 and 3, both in construction and operation. In the species shown in Figs. 1, 2 and 3 of the drawings the grooves 72 and the guide pins 75 are provided to cause axial movement of each member 45 relative to the associated driving element and relative rotation thereof. In the species shown in Fig. 4 of the drawings the grooves 72 and the guide pins 75 are not employed, but are replaced by different means.

Referring to Fig. 4 of the drawings, it will be seen that the member 45 has in the axial face thereof opposite the teeth 46, a plurality of conical recesses, one of which is shown in Fig. 4, and is indicated by reference numeral 80. In addition, driving element 50 has axially extending holes therein in each of which there is mounted a pin 81 having a conical head adapted to be received by a conical recess 80 when the member 45 is in the disengaged position. The head of each pin has a flat face on the exposed end, while each head is of such thickness as to project from the face of the driving element 50 a distance somewhat less than the depth of the teeth 46.

In operation, on movement of the driving element 50 forward relative to the member 45, the conical faces on the heads of the pins 81 press against the faces of the conical recesses 80 in the member 45, thus causing axial movement of the member 45 relative to the element 50 so that the teeth 46 on the member 45 become substantially fully engaged with the teeth 14 on the member 12 before the member 45 passes out of engagement with the heads of the pins 81.

When the member 12 turns more rapidly than the member 45 associated with the element 50, the sloping faces at the leading sides of the teeth 14 on the member 12 engage the sloping faces on the trailing sides of the faces on the teeth 46 and move the member 45 rotatively and axially relative to the element 50 so that the heads on the pins 81 again extend into the recesses 80 in the member 45.

It will be seen that in both species of overrunning clutch disclosed herein, there is means effective upon forward rotation of a driving element relative to a driving member 45 to cause the member 45 to move axially relative to the driving element so as to move from the disengaged to the engaged position. In the species shown in Figs. 1, 2 and 3, this means is the helical grooves 72 and the guide pins 75, while in the species shown in Fig. 4 this means is the conical recesses 80 and the conical heads on the pins 81.

In addition, it will be seen that in each species there is means effective upon forward rotation of the driven member 12 relative to a driving member 45 to cause the member 45 to move axially relative to the associated driving element so as to move from the engaged to the disengaged position. In each species the sloping faces on the leading sides of the teeth on the driving member 12 and on the trailing sides of the teeth on the member 45 cause this movement of the member 45, while in the species shown in Figs. 1, 2 and 3 of the drawings, the helical grooves 72 and the guide pins 75 assist in this action.

Although we have herein illustrated and described one form of improved overrunning clutch embodying our invention, it should be understood that the invention is not limited to these details of construction and that numerous changes and modifications may be made therein without departing from the spirit and scope of the following claims.

We claim:

1. In an overrunning clutch for at times transmitting torque from a driving to a driven shaft axially aligned therewith, said clutch comprising an element adapted to be rigidly secured on one of said shafts, a first member, said first member and said element having cooperating driving portions which are arranged so that said first member is movable rotatively relative to said element a limited distance between a first position in which effective driving connection is established between said member and said element and a second position, a second member adapted to be rigidly secured on the other one of said shafts, said first and second members having confronting faces provided with jaw clutch teeth, said first member being axially movable relative to said element between an engaged position in which the teeth on said first member are in engagement with the teeth on said second member and a disengaged position in which the teeth on said first member are out of engagement with the teeth on said second member, means responsive to rotative movement of said first member relative to said element to said first position for causing said member to move axially relative to said element and said second member to the engaged position, means effective on relative rotative movement in a predetermined direction between said first member and said second member to cause said first member to move axially to the disengaged position and to also cause said first member to move rotatively relative to said element to said second position, one of said members having secured thereon a dog movable between a first and a second position, said dog being effective when in its second position and said first member is adjacent its disengaged position to prevent relative rotative movement between said first and second members in a selected direction, whereby rotative movement of said element in said selected direction relative to said second member will cause said first member to move relative to said element to said first position, means responsive to relative rotative movement of said members in said selected direction for moving said dog from said first to said second position, and means yieldingly opposing axial movement of said first member away from said disengaged position.

2. In an overrunning clutch for at times transmitting torque from a driving shaft to a driven shaft axially aligned therewith, said clutch comprising an element adapted to be rigidly secured on one of said shafts, a first member associated with said element, cooperating projection and recess means on said element and said first member operating to provide a driving connection therebetween and also operating to permit limited rotative movement therebetween, means responsive to rotative movement between said first member and said element in a predetermined direction for causing said first member to move axially relative to said element from the disengaged position to the engaged position, a second member adapted to be rigidly secured on the other one of said shafts, said first and second members having confronting faces provided with jaw clutch teeth, the teeth on said members being in engagement or out of engagement according as said first member is in its engaged or its disengaged position, means responsive to rotative movement between said first and second members in a selected direction for causing said first member to move axially relative to said element to the disengaged position, one of said members having secured thereon a dog movable from a first to a second position, the other one of said members having thereon a projection adapted to be engaged by said dog when said dog is in its second position, said dog and projection being arranged so that they engage when said first member is in its disengaged position and become disengaged on movement of said first member towards the engaged position far enough to cause partial engagement of the teeth on said first and second members, said dog and projection being effective when engaged to prevent the one of said members associated with the driving shaft from rotating forward relative to the other one of said members, a spring device carried by the member on which the dog is mounted, said spring device frictionally engaging the other one of said members and being responsive to movement of the one of said members secured on the driving shaft forward relative to the other one of said members for causing said dog to occupy its second position, and means including said spring device yieldingly resisting initial movement only of said first member axially away from said disengaged position.

3. In an overrunning clutch for at times transmitting torque from a driving shaft to a driven shaft axially aligned therewith, said clutch comprising a first driving member in the form of a drum adapted to be rigidly secured on the driving shaft, a second driving member mounted in said drum, cooperating projection and recess means on the inner face of said drum and on the outer face of said driving member operating to provide a driving connection therebetween and also operating to permit limited rotative movement therebetween, means comprising a helical guide on one of said driving members and a cooperating guide element on the other one of said driving members for causing said second driving member to move axially relative to said first driving member between a disengaged and an engaged position in response to relative rotative movement between said driving members, a driven member adapted to be rigidly secured on said driven shaft, said second driving member and said driven member having annular confronting faces provided with jaw clutch teeth, the teeth on said members being in engagement or out of engagement according as said first member is in its engaged or its disengaged position, said second driving member having on an axially extending face thereof a plurality of projections arranged in alignment radially and of limited axial extent, a rocker pivotally supported on said driven member and having an end portion located in substantially the same axial plane as said projections when said second driving member is in said disengaged position, said rocker end being movable from a first to a second position in which the rocker end engages one of said projections so as to prevent rotative movement of said second driving member forward relative to said driven member, a spring member frictionally engaging said second driving member, said spring member being effective to cause said rocker end to move to said second position on rotation of said second driving member forward relative to said driven member, and means yieldingly opposing movement of said second driven member away from said disengaged position.

4. In an overrunning clutch for at times transmitting torque from a driving shaft to a driven shaft axially aligned therewith, a first driving member in the form of a drum adapted to be rigidly secured on the driving shaft, a driven member adapted to be rigidly secured on the driven shaft and having a hub portion located within said first driving member, an annular second driving member mounted on the hub portion of said driven member and located within said drum, said second driving member and said driven member having annular confronting faces provided with jaw clutch teeth, said second driving member being movable axially relative to said first driving member between an engaged position in which the teeth on said second driving member and said driven member are in engagement and a disengaged position in which the teeth on said second driving member and said driven member are out of engagement, said second driving member having on the inner face thereof a plurality of projections disposed in substantially the same axial plane, the driven member hub portion having pivotally secured thereto a plurality of rockers each of which has at its end rotatively in arrears of the rocker pivot an end movable radially outwardly from a first position to a second position in which the rocker end engages the projections on said second driving member, a spring member movably mounted on said driven member and frictionally engaging the inner surface of said second driving member, said spring member being effective to move the rocker ends to their second position in response to rotative movement of said second driving member forward relative to said driven member, cooperating projection and recess means on the inner face of said drum and on the outer face of said driving member operating to provide a driving connection therebetween and also operating to permit limited rotative movement therebetween, and means comprising a helical guide on one of said driving members and a cooperating guide element on the other one of said driving members for causing said second driving member to move axially relative to said first driving member between a disengaged and an engaged position in response to relative rotative movement between said driving members.

5. In an overrunning clutch for at times transmitting torque from a driving shaft to a driven shaft axially aligned therewith, a first driving member in the form of a drum adapted to be rigidly secured on the driving shaft, a driven member adapted to be rigidly secured on the driven shaft and having a hub portion located within said first driving member, an annular second driving member mounted on the hub portion of said driven member and located within said drum, said second driving member and said driven member having annular confronting faces provided with jaw clutch teeth, said second driving member being movable axially relative to said first driving member between an engaged position in which the teeth on said second driving member and said driven member are in engagement and a disengaged position in which the teeth on said second driving member and said driven member are out of engagement, said second driving member having on the inner face thereof a plurality of projections disposed in substantially the same axial plane, the driven member hub portion having pivotally secured thereto a plurality of rockers each of which has at its end rotatively in arrears of the rocker pivot an end movable radially outwardly from a first position to a second position in which the rocker end engages the projections on said second driving member, a spring member movably mounted on said driven member and frictionally engaging the inner surface of said second driving member, said spring member being effective to move the rocker ends to their second position in response to rotative movement of said second driving member forward relative to said driven member, cooperating projection and recess means on the inner face of said drum and on the outer face of said driving member operating to provide a driving connection therebetween and also operating to permit limited rotative movement therebetween, means comprising a helical guide on one of said driving members and a cooperating guide element on the other one of said driving members for causing said second driving member to move axially relative to said first driving member between a disengaged and an engaged position in response to relative rotative movement between said driving members, and means yieldingly opposing movement of said second driving member away from its disengaged position.

6. In an overrunning clutch, a driven member and a first driving member rotatable about a common axis and having jaw clutch teeth in the confronting faces thereof, a second rotatable driving member adapted to be connected to a driver, said first and second driving members having spaced mutually engageable driving portions for transmitting power from said second to said first driving member, said driving portions being arranged so that said driving members are rotatable relative to each other a limited amount, said first driving member being movable axially relative to said second driving member between an engaged position in which the teeth on said first driving member are in engagement with the teeth on said driven member and a disengaged position in which the teeth on said driven member are out of engagement with the teeth on said driven member, means responsive to forward rotative movement of said second driving member relative to said first driving member for moving said first driving member axially from said disengaged position to said engaged position, a spring unit oscillatably mounted on said driven member and frictionally engaging said first driving member, said spring unit being turned relative to said driven member by force transmitted through said frictional contact in response to relative rotation of said driving and driven members, a rocker pivotally mounted on said driven member and movable between a first and a second position by said spring unit according as said first driving member rotates less or more rapidly than said driven member, said rocker and said first driving member having cooperating portions which engage when and only when said rocker is substantially in its second position and said first driving member is substantially in its disengaged position, said cooperating portions when engaged coupling said first driving member to said driven member, whereby on forward rotative movement of said second driving member relative to said driven member there is forward rotative movement of said second driving member relative to said first driving member, means responsive to rotation of said driven member forward relative to said first driving member while said first driving member is adjacent said engaged position for moving said first driving member axially away from said driven member to the disengaged position, and means including said spring unit for yieldingly opposing axial movement of said first driving member away from one of its two positions.

7. In an overrunning clutch for at times transmitting torque from a driving to a driven shaft axially aligned therewith, said clutch comprising an element adapted to be rigidly secured on one of said shafts, a first member, a second member adapted to be rigidly secured on the other one of said shafts, said first member and said element having spaced mutually engageable driving portions for transmitting power between said first member and said element, said driving portions being arranged so that said first member and said element are rotatable relative to each other a limited amount, said first and second members having jaw clutch teeth in the confronting faces thereof, said first member being movable axially relative to said element between an engaged position in which the teeth on said first member are in engagement with the teeth on said second member and a disengaged position in which the teeth on said first member are out of engagement with the teeth on said second member, means responsive to rotative movement of said element relative to said first member in a selected direction for moving said first member axially from said disengaged position to said engaged position, means responsive to rotative movement of said second member relative to said first member in said selected direction for moving first member axially from said engaged to said disengaged position, a rocker pivotally mounted on one of said members and movable between a first and a second position, said rocker and the one of said members other than the one on which said rocker is mounted having cooperating portions which engage when and only when said rocker is substantially in its second position and said first member is substantially in its disengaged position, said cooperating portions when engaged coupling said first member to said second member, whereby on movement of the portion of said clutch adapted to be secured on said driving shaft forward relative to the portion of said clutch adapted to be secured on the driven shaft there is movement between said first member and said element in said selected direction, means responsive to rotative movement of the portion of said clutch adapted to be secured on said driving shaft forward relative to the portion of said clutch adapted to be secured on the driven shaft for moving said rocker to its second position, said means comprising an arm supported on the member on which said rocker is pivoted and frictionally engaging the other one of said members, and a spring yieldingly resisting initial movement only of said first member axially from a selected end of its range of movement.

JOHN E. STORER, Jr.
WILLIAM G. LIVEZEY.

References Cited in the file of this patent

UNITED STATES PATENTS

| Number | Name | Date |
|---|---|---|
| 1,862,188 | Legge | June 7, 1932 |
| 2,224,322 | Sinclair | Dec. 10, 1940 |
| 2,515,114 | Chilton | July 11, 1950 |

FOREIGN PATENTS

| Number | Country | Date |
|---|---|---|
| 330,053 | Italy | Oct. 2, 1935 |
| 877,759 | France | Dec. 16, 1942 |